United States Patent [19]

Deckers et al.

[11] Patent Number: 5,475,055

[45] Date of Patent: Dec. 12, 1995

[54] THERMOPLASTIC MOLDING MATERIAL WITH A MATT EFFECT

[75] Inventors: Andreas Deckers, Ludwigshafen; Norbert Guentherberg, Speyer; Rainer Bueschl, Roedersheim-Gronau; Ekkehard Jahns, Hirschberg, all of Germany

[73] Assignee: BASF Aktiengesellschaft, Ludwigshafen, Germany

[21] Appl. No.: 327,880

[22] Filed: Oct. 24, 1994

Related U.S. Application Data

[63] Continuation of Ser. No. 102,749, Aug. 6, 1993, abandoned.

[30] Foreign Application Priority Data

Aug. 13, 1992 [DE] Germany .................. 42 26 750.1

[51] Int. Cl.$^6$ .................................................. C08L 51/04
[52] U.S. Cl. ...................... 525/77; 525/78; 525/80; 525/79; 525/83; 525/84; 525/85; 525/221; 525/222; 525/223; 525/228; 525/230
[58] Field of Search .................. 525/77, 78, 79, 525/80, 83, 85, 74, 84, 221, 222, 223, 228, 230

[56] References Cited

U.S. PATENT DOCUMENTS

| | | | |
|---|---|---|---|
| 3,449,470 | 6/1969 | Garbowski | 525/87 |
| 4,857,591 | 8/1989 | Eichenauer et al. | 525/77 |
| 4,897,449 | 1/1990 | Gaillard et al. | 525/77 |

FOREIGN PATENT DOCUMENTS

| | | |
|---|---|---|
| 342283 | 11/1989 | European Pat. Off. . |
| 443608 | 8/1991 | European Pat. Off. . |
| 3322748 | 1/1985 | Germany . |

*Primary Examiner*—Paul R. Michl
*Assistant Examiner*—Mark L. Warzel
*Attorney, Agent, or Firm*—Keil & Weinkauf

[57] ABSTRACT

A thermoplastic molding material containing, based on the sum of its constituents A, B and C, A: 70 to 99% by weight of a thermoplastic resin A comprising, based on A,
  A1: 50 to 100% by weight of a hard matrix A1 comprising, based on A1,
   A11: 50 to 95% by weight of units of an aromatic vinyl compound or methyl methacrylate or their mixtures (A11) and
   A12: 5 to 50% by weight of units of acrylonitrile A12;
  A2: up to 50% by weight of a rubber-elastic particulate graft copolymer A2 comprising, based on A2,
   A21: 30 to 80% by weight of at least one elastomeric graft base A21 having a median particle size of from 30 to 1000 nm comprising, based on A21,
    A211: 50 to 100% by weight of units of a 1,3-diene or a $C_4$–$C_8$ alkyl acrylate forming rubber-elastic polymers (A211),
    A212: up to 50% by weight of units of at least one vinyl monomer A212;
and
   A22: 15 to 85% by weight of a graft shell A22 comprising, based on A22,
    A221: 50 to 90% by weight of units of an aromatic vinyl monomer A221 and
    A222: 10 to 50% by weight of units of acrylonitrile A222;
  B: 0.5 to 15% by weight of a nitrile rubber B comprising, based on B,
  B1: 10 to 40% by weight of units of acrylonitrile, and
  B2: 60 to 90% by weight of units of butadiene;
and
  C: 0.5 to 15% by weight of a particulate polymer C distributed in the hard matrix A and comprising, based on C,
  C1: 80 to 99% by weight of units of methyl methacrylate,
  C2: 0.5 to 15% by weight of units of an ester of acrylic acid,
  C3: 0.5 to 5% by weight of units of a crosslinking monomer copolymerizable with C1 and C2, and
  C4: up to 10% by weight of units of a polar monomer selected from (meth)acrylic acid, hydroxyethyl (meth)acrylate and dimethylaminoethyl (meth)acrylate, the median particle size of C being from 50 to 50,000 nm.

1 Claim, No Drawings

THERMOPLASTIC MOLDING MATERIAL WITH A MATT EFFECT

This application is a continuation of application Ser. No. 08/102,749, filed on Aug. 6, 1993, abandoned.

For a number of applications, for example in the automobile interiors sector, it is desirable to use impact-modified thermoplastics having a matt surface in order to achieve a glare-free surface.

According to the disclosures in DE-C 33 22 748 and U.S. Pat. No. 3,449,470 matt ABS molding materials are obtained for example by adding nitrile rubber. Another way of reducing the surface glare is to use polymers containing epoxy and acidic groups (DE 33 40 591).

EP-A-342 283 describes the possibility of achieving a matt effect by adding crosslinked acrylic polymers to thermoplastic molding materials. Although ABS molding materials prepared in this way have a certain matt effect, at the same time a sharp drop is observed in the multiaxial toughness and other mechanical properties.

For many applications the matt effect that can be achieved using the known means is insufficient if, at the same time, a high mechanical load-bearing capacity is desired.

It is an object of the present invention to provide a molding material based on an impact-modified SAN copolymer having an improved, velvetlike matt effect without any noticeable losses in mechanical strength.

We have found that this object is achieved by a combination of an unmodified or impact-modified SAN polymer and a nitrile (NBR) rubber and also a crosslinked PMMA copolymer. A product is obtained having a velvet-matt surface together with a sufficient mechanical strength.

The invention accordingly relates to a thermoplastic molding material that contains, based on the sum of its constituents A, B and C, A: 70 to 99% by weight of a thermoplastic resin A comprising, based on A,
  A1: 50 to 100% by weight of a hard matrix A1 comprising, based on A1,
    A11: 50 to 95% by weight of units of an aromatic vinyl compound or methyl methacrylate or of a mixture thereof (A11) and
    A12: 5 to 50% by weight of units of acrylonitrile A12;
  A2: up to 50% by weight of a rubber-elastic particulate graft copolymer A2 comprising, based on A2,
    A21: 30 to 80% by weight of at least one elastomeric graft base A21 having a median particle size of from 30 to 1000 nm comprising, based on A21,
      A211: 50 to 100% by weight of units of a 1,3-diene or a $C_4$–$C_8$ alkyl acrylate forming rubber-elastic polymers (A211),
      A212: up to 50% by weight of units of at least one vinyl monomer A212;
    and
    A22: 15 to 85% by weight of a graft shell A22 comprising, based on A22,
      A221: 50 to 90% by weight of units of an aromatic vinyl monomer A221 and
      A222: 10 to 50% by weight of units of acrylonitrile A222;
B: 0.5 to 15% by weight of a nitrile rubber B comprising, based on B,
  B1: 10 to 40% by weight of units of acrylonitrile, and
  B2: 60 to 90% by weight of units of butadiene;
and
C: 0.5 to 15% by weight of a particulate polymer C distributed in the hard matrix A and comprising, based on C,
  C1: 80 to 99% by weight of units of methyl methacrylate,
  C2: 0.5 to 15% by weight of units of an ester of acrylic acid,
  C3: 0.5 to 5% by weight of units of a crosslinking monomer copolymerizable with C1 and C2, and
  C4: up to 10% by weight of units of a polar monomer selected from (meth)acrylic acid, hydroxyethyl (meth)acrylate and dimethylaminoethyl (meth)acrylate, the median particle size of C being from 50 to 50,000 nm.

The molding material according to the invention may also contain conventional additives such as dyes, pigments, antioxidants, fillers, glass fibers, flame-proofing agents, etc., in amounts of up to 20% by weight.

The molding materials according to the invention have a velvetlike surface, the mechanical properties of a corresponding SAN molding material being retained.

The following should specifically be said regarding the preparation of a molding material according to the invention and its constituents:

The hard matrix A1 can be prepared per se, but is also formed in the grafting process (if impact-modified SAN polymers are involved) if the initial elastomer A21 is grafted with the monomers A11 and A12 (or A221 and A222) constituting the hard matrix. A11 and A12 may differ at least partially, and in any case as regards the quantitative proportions, from A221 and A222.

Preference is given to the aromatic vinyl compound styrene or α-methylstyrene. The quantitative ratio of A11 to A12 or A221 to A222 is preferably from 60 to 85 to from 15 to 40.

SAN polymers are obtained for example according to the details given in Kunststoffhandbuch, edited by Vieweg, Daumiller, Vol. V, Polystyrene, Munich, 1969, p. 124ff. Suitable products, which are also commercially available, for example have a viscosity number VN, determined according to DIN 53 726 at 25° C., 0.5% in DMF, of 50 to 100 [ml/g].

However, preference is given to impact-resistant SAN (known as ABS when polybutadiene is used as impact-modifying agent), which in many cases is prepared by emulsion polymerization. In this process, for example 15 to 85% by weight of an elastomer in the form of a latex and based on butadiene containing up to 30% by weight of styrene, or of a (co)polymer, also in the form of a latex, of an ester of acrylic acid, is reacted as graft base with 15 to 85% by weight of styrene and acrylonitrile. Styrene and acrylonitrile are generally used in a ratio of 20:1 to about 4:6.

It goes without saying that styrene may be wholly or partially replaced by its usual substitutes (for example alkylstyrenes or methyl methacrylate).

The graft rubber A2 thus comprises an elastomer (rubber) A21, which accounts for 30 to 80% by weight, preferably 50 to 80% by weight, and in particular 70 to 55% by weight, in each case based on A2, and a shell A22 grafted onto the elastomer. The elastomer A21 comprises a latex of polyacrylate or preferably of polymers of butadiene (or substituted butadiene such as isoprene, chloroprene, etc.) or contains, based on A21, up to 30% by weight of a comonomer incorporated by polymerization, from the group comprising styrene and acrylonitrile, and having a median particle size of from 30 to 1000 nm, preferably from 100 to 750 nm ($d_{50}$ value of the cumulative weight distribution). The graft shell A22 comprises at least one aromatic vinyl monomer having 8 to 12 carbon atoms A221, and at least one monoethylenically unsaturated monomer A22. The graft shell is prepared in a conventional manner by emulsion polymerization of the graft monomers A221, A222 in the presence of the rubber A21. The graft shell A22 may also be obtained in 2 process stages, as described for example in EP 258 714.

The elastomer A21 is for its part prepared by polymerizing butadiene, possibly together with further comonomers, in aqueous emulsion at a temperature of from 20° to 100° C., preferably from 50° to 80° C. Conventional emulsifiers may be used, such as alkali metal salts of alkylsulfonic or alkylarylsulfonic acids, alkyl sulfates, fatty alcohol sulfonates, salts of higher fatty acids having 10 to 30 carbon atoms, or resin soaps. Detailed descriptions of the preparation of rubber latices are given for example in EP 062 901, EP 258 714, DE 24 27 960 and DE 126 035. The preparation of the necessary polybutadiene and polyacrylate latices is generally known.

The nitrile rubber B is present in the molding material in a proportion of 0.5 to 15% by weight, preferably 1.5 to 7% by weight, and in particular 2 to 6% by weight, in each case based on the sum of A, B and C.

Suitable nitrile rubbers are commercially available nitrile rubbers containing from 5 to 35% by weight, in particular 15 to 30% by weight of acrylonitrile (the remainder being butadiene). These AN-Bu copolymers may be prepared by emulsion polymerization or bulk polymerization. The Mooney viscosity according to ASTM D 1646-81 serves as a measure of the plasticity. Suitable nitrile rubbers according to the invention may have a Mooney viscosity, measured at 100° C., of from 15 to 130, in particular from 45 to 100. The preparation of such rubbers in emulsion is described in U.S. Pat. No. 3,449,470. A detailed description is also given in DE-C 33 22 784.

The mixing constituent C to be used according to the invention is a particulate copolymer that can be obtained for example according to the details given in EP 443 609. According to this, a modified polymethyl methacrylate is prepared in a suspension polymerization process in which, on the one hand, modifying monomers having polar groups such as hydroxyl, carboxyl or diethylamino can be incorporated (C4) and, on the other hand, a certain amount of a crosslinking monomer (C3) and a fairly long-chain acrylic ester (C2) are used as well.

Polymers C that satisfy the aforementioned prerequisites are also available commercially.

The following constituents were prepared for the Examples described hereinafter:

Graft Copolymer A-1

A polybutadiene latex is prepared by polymerizing 600 parts of butadiene up to a conversion rate of 98% in the presence of a solution of 6 parts of tert-dodecyl mercaptan, 7 parts of sodium $C_{14}$-alkylsulfonate as emulsifier, 2 parts of potassium peroxodisulfate, and 2 parts of sodium pyrosulfate in 800 parts of water at 65° C.

A polybutadiene is obtained whose median particle size is 100 nm. The latex is agglomerated by adding 250 parts of a 10% emulsion of a copolymer comprising 96% by weight of ethyl acrylate and 4% by weight of methacrylamide, a median particle size of 350 nm being established. After the addition of 400 parts of water, 4 parts of sodium $C_{14}$-alkylsulfonate, and 2 parts of potassium peroxodisulfate, 400 parts of a mixture comprising 70% by weight of styrene and 30% by weight of acrylonitrile are added within 4 hours and the reaction mixture is held at 75° C. while stirring. The conversion, based on styrene/acrylonitrile, is practically quantitative. The graft rubber dispersion that is obtained is precipitated with aqueous magnesium sulfate solution and the water is removed.

Graft Copolymer A-2

160 parts of a mixture of 98% by weight of butyl acrylate and 2% by weight of dicyclopentadienyl acrylate (DCPA) were heated while stirring at 60° C. in 1500 parts of water with the addition of 5 parts of the sodium salt of a $C_{12}$–$C_{18}$-paraffinsulfonic acid, 3 parts of potassium peroxodisulfate, 3 parts of sodium hydrogen carbonate, and 1.5 parts of sodium pyrophosphate. 15 minutes after the kick-off of the polymerization reaction a further 840 parts of the monomer mixture are added within 3 hours. After completion of the addition of monomer the emulsion is held for a further hour at 60° C.

1150 parts of water and 2.7 parts of potassium peroxodisulfate are added to 2100 parts of the emulsion and the mixture is heated to 65° C. while stirring. After the reaction temperature has been reached 560 parts of a mixture of 75% by weight of styrene and 25% by weight of acrylonitrile are metered in over 3 hours. After completion of the addition the reaction mixture is held for 2 hours at 65° C. The product is precipitated with magnesium sulfate solution and washed with water, and the water is removed.

Nitrile Rubber B

A commercial product having a Mooney viscosity $ML_4$ (100° C.) of 50 and an AN content of 30% by weight was used.

General Instructions for Preparing the Particulate copolymer C

A two-phase mixture of an aqueous dispersion and monomers is placed in a 3 liter vessel equipped with a dispenser stirrer (diameter 5 cm) and the mixture is dispersed for 30 minutes at 3500 $min^{-1}$. The dispersion is then heated to 67° C. and the now slowly reacting mixture is transferred by means of a hose pump to a preheated 3 liter vessel equipped with an anchor stirrer (150 $min^{-1}$). The mixture is kept for a further 2.5 hours at 67° C., then for one hour at 75° C., followed by a further hour at 85° C. The dispersion obtained can be precipitated by freeze coagulation, dewatered and dried.

Preparation of C-1

Aqueous phase:
1300 g of water, 12 g of a 1.6% strength solution of a copolymer of 65 MAA/35 MMA (neutralized with NaOH to pH 7), 400 g of a partly saponified polyvinyl acetate solution, commercially available as Mowiol 40–88 (10% strength).

Monomer phase:
873 g of methyl methacrylate, 27 g of butanediol dimethacrylate, 0.15 g of tert-butyl perpivalate, 0.58 g of dilauryl peroxide, 0.29 g of tert-butyl peroxyneodecanoate, 4.5 g of tert-dodecyl mercaptan.

The dispersion prepared using the above starting materials has a solids content of 34.4%. The particle size is in the range from 1000 to 18,000 nm, the overforming proportion being in the range from 2000 to 6000 nm.

In order to evaluate the following examples and for purposes of comparison, the notched impact strength according to DIN 53 453 was measured on small standard specimens.

For the gloss measurements, roundels were molded in a highly polished mold in an injection molding machine at a melt temperature of 250° C. The gloss was measured according to DIN 67 530 using a Dr. Lange reflectometer UME 1 at an incident beam angle of 45°.

COMPARATIVE EXAMPLE 1

22 parts of the SAN-grafted polybutadiene rubber as prepared for A-1 are mixed with 78 parts of commercially available SAN (35% AN) in a twin-screw extruder at 250° C. The product has a notched impact strength of 11 kJ/m$^2$ at room temperature and exhibits 68% reflection in the gloss measurement.

COMPARATIVE EXAMPLE 2

22 parts of the SAN-grafted polybutadiene rubber A-1 are mixed with 73 parts of SAN (35% AN) and 5 parts of nitrile rubber B (component B) in a twin-screw extruder at 250° C. The product has a notched impact strength of 13 kJ/m$^2$ at room temperature and exhibits 43% reflection in the gloss measurement.

COMPARATIVE EXAMPLE 3

22 parts of the SAN-grafted polybutadiene rubber A-1 are mixed with 73 parts of SAN (35% AN) and 5 parts of the particulate copolymer C in a twin-screw extruder at 250° C. The product has a notched impact strength of 10 kJ m$^2$ at room temperature and exhibits 33% reflection in the gloss measurement.

EXAMPLE 1 ACCORDING TO THE INVENTION 22 parts of the SAN-grafted polybutadiene rubber A-1 are mixed with 70 parts of SAN (35% AN), 5 parts of nitrile rubber and 3 parts of finely particulate copolymer C-1 in a twin-screw extruder at 250° C. The product has a notched impact strength of 12 kJ/m$^2$ at room temperature and exhibits 17% reflection.

EXAMPLE 2 ACCORDING TO THE INVENTION 29 parts of the SAN-grafted polyacrylate rubber A-2 are mixed with 70 parts of SAN (35% AN), 5 parts of nitrile rubber and 3 parts of finely particulate copolymer C-1 in a twin-screw extruder at 250° C. The product has a notched impact strength of 5 kJ/m$^2$ at room temperature and exhibits 23% reflection.

We claim:

1. A thermoplastic molding material containing, based on the sum of its constituents A, B and C, A: 70 to 99% by weight of a thermoplastic resin A comprising, based on A, A1: 50 to 100% by weight of a hard matrix A1 comprising, based on A1:
   A11: 50 to 95% by weight of units of styrene (A11) and
   A12: 5 to 50% by weight of units of acrylonitrile A12;

A2: up to 50% by weight of a rubber-elastic particulate graft copolymer A2 comprising, based on A2,
   A21: 30 to 80% by weight of at least one elastomeric graft base A21 having a median particle size of from 30 to 1000 nm comprising, based on A21,
    A211: 50 to 100% by weight of units of a 1,3-diene or a $C_4$–$C_8$alkyl acrylate forming rubber-elastic polymers (A211),
    A212: up to 50% by weight of units of styrene A212;
  and
   A22: 15 to 85% by weight of a graft shell A22 comprising, based on A22,
    A221: 50 to 90% by weight of units of styrene A221 and
    A222: 10 to 50% by weight of units of acrylonitrile A222;

said thermoplastic resin A being obtained by emulsion polymerization of 15 to 85% by weight of an elastomer in the form of a latex and based on butadiene containing up to 30% by weight of styrene, or of a polymer, also in the form of a latex, of an ester of acrylic acid, as graft base, with 15 to 85% by weight of styrene and acrylonitrile in a ratio of styrene and acrylonitrile 20:1 to 4:6;

B: 0.5 to 15% by weight of a nitrile rubber B comprising, based on B,
   B1: 10 to 40% by weight of units of acrylonitrile, and
   B2: 60 to 90% by weight of units of butadiene;
and
  C: 0.5 to 15% by weight of a particulate polymer C distributed in the hard matrix A and comprising, based on C,
   C1: 80 to 99% by weight of units of methyl methacrylate,
   C2: 0.5 to 15% by weight of units of an ester of acrylic acid,
   C3: 0.5 to 5% by weight of units of a crosslinking monomer copolymerizable with C1 and C2, and
   C4: up to 10% by weight of units of a polar monomer selected from (meth)acrylic acid, hydroxyethyl (meth)acrylate and dimethylaminoethyl (meth)acrylate,
the median particle size of C being from 50 to 50,000 nm.

* * * * *